United States Patent
McRae

(10) Patent No.: US 12,495,339 B2
(45) Date of Patent: Dec. 9, 2025

(54) DETECTION AND MITIGATION OF A NETWORK OUTAGE FOR SMART DEVICES IN A NETWORKED SYSTEM

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 600 days.

(21) Appl. No.: 17/851,600

(22) Filed: Jun. 28, 2022

(65) Prior Publication Data

US 2022/0417810 A1   Dec. 29, 2022

Related U.S. Application Data

(60) Provisional application No. 63/216,205, filed on Jun. 29, 2021.

(51) Int. Cl.
*H04W 36/06* (2009.01)
*H04L 45/00* (2022.01)
*H04W 36/30* (2009.01)
*H04W 40/12* (2009.01)
(Continued)

(52) U.S. Cl.
CPC ............ *H04W 36/06* (2013.01); *H04L 45/22* (2013.01); *H04W 36/305* (2018.08);
(Continued)

(58) Field of Classification Search
CPC ...... H04L 45/22; H04W 24/04; H04W 36/06; H04W 36/305; H04W 40/12;
(Continued)

(56) References Cited

U.S. PATENT DOCUMENTS 10,594,990 B1   3/2020   Lemberger et al.
2007/0206537 A1*  9/2007   Cam-Winget ........ H04W 12/06
                                               370/331
(Continued)

FOREIGN PATENT DOCUMENTS

EP   2100454   9/2009
EP   2693811   2/2014
(Continued)

OTHER PUBLICATIONS

U.S. Appl. No. 17/851,619, filed Jun. 28, 2022.
U.S. Appl. No. 17/825,196, filed May 26, 2022.

*Primary Examiner* — Awet Haile
(74) *Attorney, Agent, or Firm* — Boyle Fredrickson, S.C.

(57) ABSTRACT

A networked electronic system and method are provided. The system includes a hub primary radio being defined within a primary communication path. The primary communication path has an operational state wherein data is transmittable therethrough and a fault state. Communication of data between a device primary radio of an electronic device and the hub primary radio through a primary communication path is monitored such that communication of the data is transferred to a secondary communication path between a device secondary radio of the device and a hub secondary radio in response to detection of a fault state on the primary communication path. The secondary communication path has a different frequency than the primary communication path. The system may be a monitoring system, and the device may be a monitoring device such as an imaging device including a camera.

19 Claims, 4 Drawing Sheets

(51) Int. Cl.
*H04W 40/28* (2009.01)
*H04W 72/0453* (2023.01)

(52) U.S. Cl.
CPC .......... *H04W 40/12* (2013.01); *H04W 40/28* (2013.01); *H04W 72/0453* (2013.01)

(58) Field of Classification Search
CPC . H04W 40/28; H04W 72/0453; H04W 76/19; H04W 84/12; H04W 88/06
See application file for complete search history.

(56) References Cited

U.S. PATENT DOCUMENTS

| | | |
|---|---|---|
| 2011/0275316 A1 | 11/2011 | Suumaki et al. |
| 2013/0035093 A1* | 2/2013 | Doyle .................. H04W 88/06 455/426.1 |
| 2014/0010210 A1* | 1/2014 | Rhodes ............. H04W 52/0225 370/336 |
| 2014/0266705 A1 | 9/2014 | McKinley et al. |
| 2014/0337923 A1 | 11/2014 | Anders et al. |
| 2014/0354768 A1 | 12/2014 | Mei et al. |
| 2016/0338136 A1 | 11/2016 | Zhang et al. |
| 2017/0099157 A1 | 4/2017 | Jacobson et al. |
| 2018/0286200 A1* | 10/2018 | Gordon .................. G08B 29/18 |
| 2019/0213854 A9* | 7/2019 | Siann ................. G08B 13/1966 |
| 2019/0261243 A1* | 8/2019 | Amini ...................... G08B 3/10 |
| 2020/0344695 A1 | 10/2020 | Wang et al. |

FOREIGN PATENT DOCUMENTS

| | | |
|---|---|---|
| EP | 2740301 | 6/2014 |
| WO | 2021046402 | 3/2021 |

* cited by examiner

DETECTION AND MITIGATION OF A NETWORK OUTAGE FOR SMART DEVICES IN A NETWORKED SYSTEM

CROSS-REFERENCE TO A RELATED APPLICATION

This application claims the benefit of provisional patent application U.S. App. No. 63/216,205, filed on Jun. 29, 2021 and entitled "Detection and Mitigation of a Network Outage for Smart Devices in a Networked System", the entire contents of which are hereby expressly incorporated by reference into the present application.

FIELD OF THE INVENTION

The present invention relates generally to networked electronic systems, and, in particular, to a system and method for detection and mitigation of a network outage for smart devices in such a system.

BACKGROUND OF THE INVENTION

Networked electronic systems with wireless components are increasing in popularity and technical sophistication. Such systems include smart home systems, electronic monitoring systems, and components of them. The wireless devices include HVAC controllers, appliances, lights, and monitoring devices including cameras, and sensors. Recent systems implemented through WLANs (wireless local area networks) have simplified hardware mounting and installation by eliminating various hardwired signal-conducting wires. Such systems typically include one, and more typically several, electronic devices, such as cameras and sensors, that communicate wirelessly with a base station hub in communication with a wide area network (WAN), typically via the Internet. The base station hub also communicates wirelessly with one or more user devices such as a smart phone, and possibly with an external server such as a cloud-based server.

Although avoiding hardwired component connections can simplify initial component mounting or installation, WLANs are subject to disruption from many causes. For example, the user device may simply be moved to a position in which it is outside of the range of the system's WLAN. Disruptions also may occur, for example, due to a power failure and/or outage, a primary RF (radio frequency) network outage, a primary ISP (internet service provider) outage, a primary network SSID (service set identifier) outage, network interference issues, or a change in a primary network password or other authentication failure. The number and complexity of disruption causes have continued to multiply as WLAN-based monitoring systems have evolved.

Cameras and other networked electronic devices thus can be rendered inoperable in the event of a WLAN or WAN outage or a power failure effecting one or more of the components of the electronic monitoring system. Currently, cameras or networked electronic devices that experience these issues just fall offline and are no longer operable or reachable by the end user. This failure is a nuisance, at the very least, and can be a serious problem if these devices are used for security or safety purposes.

In view of the foregoing, it can be appreciated that a need has arisen to provide a system and method for detection and mitigation of a WLAN outage, a WAN outage, or a power outage for a smart device in a networked electronic system. The need also has arisen to provide a networked electronic system in which cameras and other networked electronic devices stay connected and operational through a WLAN outage, a WAN outage or power outage and in which a user is notified of the service disruption so the user can take action.

SUMMARY OF THE INVENTION

In accordance with the present invention, a networked electronic system is provided. The networked system includes a hub primary radio being defined within a primary communication path. The primary communication path has an operational state wherein data is transmittable therethrough and a fault state. A hub secondary radio is defined within the secondary communication path and an electronic device is configured to monitor a characteristic within the environment. The electronic device includes a device primary radio, a device secondary radio and circuitry. The device primary radio is defined within the primary communication path and is configured to communicate with the hub primary radio over a first frequency. A device secondary radio is defined within the secondary communication path and is configured to communicate with the hub secondary radio over a second frequency that is different than the first frequency. The first frequency may be higher than the second frequency, and the second frequency of the secondary communication path may be in a sub-GHz (gigahertz) frequency band. Circuitry is configured to monitor communication on the primary communication path and determine if the primary communication path is in a fault state. The circuitry causes the device secondary radio and the hub secondary radio to communicate through the secondary communication path in response to the primary communication path being in the fault state.

The system may be an electronic monitoring system, and the electronic device may be a monitoring device such as an imaging device having a camera and possibly having a speaker and/or microphone, as well as one or more sensors, lights, etc.

When the primary communication path is in an operational state, the device primary radio and the hub primary radio communicate through the primary communication path. When the primary communication path returns to the operational state after being in the fault state, the circuitry is configured to reconnect the device primary radio to the hub primary radio to allow communication through the primary communication path. The primary communication path may be a wireless local area network, and the fault state may be defined at least in part by an outage of the wireless local area network. The device primary radio is electrically powered. Alternatively, the fault state may be defined by a power outage to the device primary radio.

The circuitry of the electronic device is configured to detect a communication failure through the primary communication path. The circuitry of the electronic device is configured to activate the device secondary radio upon detection of the communication failure through the primary communication path. Upon detection of the communication failure between the device primary radio and the hub primary radio through the primary communication path, the circuitry is configured to: conduct a roaming scan through the primary communication path; attempt to reestablish communications through the primary communication path; and, upon failure to reestablish communications through the primary communication path, activate the device secondary radio to communicate with the hub secondary radio through the secondary communication path.

A user interface is operatively connectable to the electronic device. The circuitry is configured to communicate information corresponding to the fault state to the user interface for display on the user interface. The electronic device is defined by at least one of: an imaging device that is configured to capture visual images or video of a monitored area within the environment; an audio device that includes at least one of: (i) a microphone, and (ii) a speaker configured for audio communication or providing audible alerts; and a sensor configured to detect at least one of: (i) motion, (ii) opening or closing events of doors or windows, (iii) smoke, (iv) carbon monoxide, (v) water leaks, and (vi) temperature changes.

In accordance with a further aspect of the present invention, a networked electronic system is provided. The system includes an electronic device configured to monitor a characteristic within an environment. The electronic device includes a device primary radio and a device secondary radio. The device primary radio is defined within a primary communication path and is configured to communicate at a first frequency. The primary communication path has an operational state wherein data is transmittable therethrough and a fault state. A device secondary radio is defined within a secondary communication path and is configured to communicate at a second frequency. The second frequency is less than the first frequency. A hub primary radio is connectable to a backend control service system through a WAN (wide area network) and is defined within the primary communication path. The hub primary radio is configured to communicate with the device primary radio via the primary communication path. A hub secondary radio is connectable to the backend control service system through the WAN and is defined within the secondary communication path, the hub secondary radio is configured to communicate with the device secondary radio via the secondary communication path. Circuitry is configured to detect the fault state of the primary communication path and, upon detection of the fault state, to activate the device secondary radio to communicate with the hub secondary radio through the secondary communication path.

A user interface may be operatively connected to the electronic device. The circuitry is configured to communicate information corresponding to the fault state of the primary communication path to the user interface for display on the user interface. When the primary communication path is in an operational state, the device primary radio and the hub primary radio communicate through the primary communication path. When the primary communication path returns to the operational state after being in the fault state, the circuitry is configured to reconnect the device primary radio to the hub primary radio to allow communication through the primary communication path.

The primary communication path may be a wireless local area network and the fault state may be defined at least in part by an outage of the wireless local area network. The device primary radio may be electrically powered and, alternatively, the fault state may be defined by a power outage to the device primary radio.

In accordance with a still further aspect of the present invention, a method for detecting and mitigating interference in an electronic networked system is provided. The method includes the step of monitoring communication of data between a device primary radio of an electronic device and a hub primary radio through a primary communication path. Communication of data is transferred to a secondary communication path between a device secondary radio of the electronic device and a hub secondary radio in response to an outage of the primary communication path. The secondary communication path has a different frequency than the primary communication path.

Data is transmitted on the primary communication path at a first frequency of at least 2.4 GHz and data is transmitted on the secondary communication path at a second frequency. The second frequency is less than the first frequency and is in a sub-GHz frequency band. The radio transmitting over the secondary communication path also typically has a longer range than the radio transmitting over the primary communication path. The primary communication path utilizes a WIFI communication protocol and the outage of the primary communication path is at least one of an outage of the WIFI communication protocol of the primary communication path and a power outage to the device primary radio.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE DRAWINGS

Figure 1:
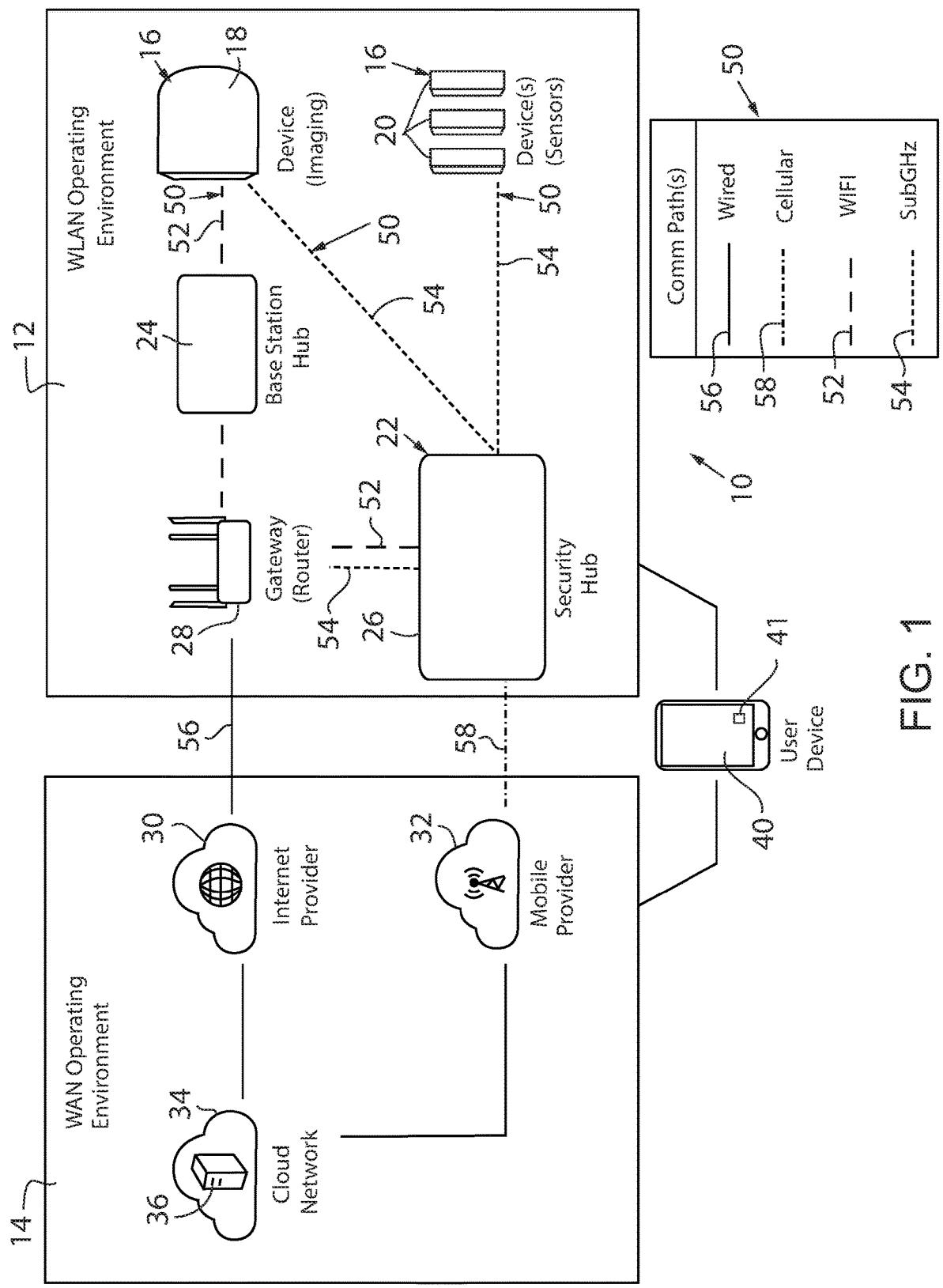
FIG. 1 is a schematic representation of a networked electronic system with a secondary communication path in accordance with an aspect of the invention.

Referring to FIG. 1, a networked electronic system 10 in accordance with an aspect of the present invention is generally designated by the reference numeral 10. System 10 is implemented in a WLAN (wireless local area network) operating environment or WLAN 12. The WLAN 12 is communicatively connected to a WAN (wide area network) operating environment or WAN 14. Within WLAN 12, various electronic devices 16, sometimes referred to as "client devices," are wirelessly networked to a base station or high frequency hub 24 which, in turn, communicates with the WAN 14 via a gateway hub shown as gateway router 28. As is conventional, base station 24 and gateway router 28 are electrically powered by and operatively connected to a power source (not shown), such as 120 volt or 240 volt, 60 Hertz, electrical power supplied by a utility.

Most systems will employ several devices 16 of the same or varying configurations as described below. Base station hub 24 and router 28 provide a high frequency connection to the WAN 14. Base station hub 24 may be eliminated as a stand-alone module if its functionality is incorporated into the gateway router 28, in which case the router 28 also serves as a base station hub. The system also includes a security hub 26 that communicates with the device(s) 16 and with the WAN 14 and that provides a low frequency connection between the WAN 14 and the devices 16. Security hub 26 is also electrically powered by and operatively connected to a power source (not shown), such as 120 volt or 240 volt, 60 Hertz, electrical power supplied by a utility, and to a power back-system 75, such as a battery back-up system, that supplies electrical power to security hub 26 in the event of a power outage of the electrical power supplied by the utility. As with the base station hub 24, the security hub 26 may be eliminated as a stand-alone module if its functionality is incorporated into the gateway router 28 and/or the base station hub, in which case the router and/or the base station hub also serves as a security hub.

In the present embodiment, security hub 26 communicates with the router 28 through a high frequency connection 52 and/or a low frequency connection 54 to router 28. The security hub 26 is also provided with the capability of providing a high frequency connection with the devices 16. The monitoring devices 16 thus have two radios operating at different frequencies. A first, "primary" radio operates at a first frequency, typically at a relatively high frequency, typically of 2.4 GHz to 5 GHZ, during periods of normal conductivity to perform monitoring and data capture functions such as video capture and transmission, sound transmission, motion sensing, etc. The second or "secondary radio" operates at a second frequency that is immune or at least resistant to interference from signals that typically jam signals over the first frequency. The second frequency may be of considerably lower frequency in the sub-GHz or even RF range and may have a longer range than the primary radio. As hereinafter described, the secondary radio may be operable, when communications over the primary communication path are disrupted, as hereinafter described, to permit the continued operation of monitoring devices 16, as well as, to permit information regarding the communications disruption to be transmitted and displayed for a user. The secondary radio typically also has a longer range than the primary radio.

The illustrated system 10 is a monitoring system with electronic devices 16 in the form of monitoring devices, it being understood that the invention also is applicable to other systems, such as smart home systems with electronic devices such as HVAC controllers, appliances, smoke detectors, and lighting systems.

Still referring to FIG. 1, each monitoring device 16 of this particular system 10 may perform a variety of monitoring, sensing and communicating functions. One such device may include an imaging device 18, such as a camera, that is configured to capture and store visual images or video of the monitored area within the environment. One such camera is a video camera, which could be an Arlo® camera available from Arlo Technologies, Inc. of Carlsbad, California Typically, system 10 will include multiple monitoring devices 16 that are mounted to face toward respective areas being monitored, such as around a building or other structure or area. In addition to containing a camera, the imaging device 18 may also include one or more sensors configured to detect one or more types of conditions or stimulus, for example, motion, opening or closing events of doors or windows, the presence of smoke, carbon monoxide, water leaks, and temperature changes. Instead of or in addition to containing sensors, the imaging device 18 may have audio device(s) such as microphones, sound sensors, and speakers configured for audio communication or providing audible alerts. Monitoring devices 16 other than imaging devices also may have some combination of sensors and/or audio devices without having imaging capability. One such device is Arlo Chime™, which has only audio capabilities. Other monitoring devices contain only sensors as indicated by device 20 in FIG. 1. An example of such a device is a smoke detector or a motion detector, such as a PIR detector. The imaging devices 18, sensors 20, or other monitoring devices 16 also may be incorporated into form factors of other house or building accessories, such as doorbells, floodlights, etc.

Still referring to FIG. 1, gateway router 28 is typically implemented as a WIFI hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s). Besides the mobile connection, security hub 26 is typically also configured to connect to WAN 14 by way of its connection to router hub 28 and the router hub's connection to WAN 14 through internet provider 30. Each of the internet provider 30 and mobile provider 32 allows the components of system 10 to interact with a backend system or control services that can control functions or perform various processing tasks for components of system 10, shown as a cloud-based backend control service system 34, which could be an Arlo SmartCloud™ system. The backend system, such as the cloud-based control service system 34, includes at least one server 36 and typically provides, for example, cloud storage of events, AI (artificial intelligence) based processing such as computer vision, and system access to emergency services.

Still referring to FIG. 1, one or more user devices 40, such as a smart phone, tablet, laptop, or PC, may communicate with various components or devices within each of WLAN 12 and WAN 14 to provide an interface through which a user may interact with system 10. Each user device 40 includes a display system that typically includes both an audio display and a video display such as a touchscreen. Each user device 40 also has internal computing and storage capabilities and a program or application, such as the Arlo Smart application, serving as the user interface for the remainder of system 10.

Still referring to FIG. 1, within WLAN 12, multiple communication paths 50 are defined that transmit data between the various components of system 10. Communication paths 50 include a default or primary communication path 52 providing communication between the monitoring device 16 and the base station hub 26, and a fail-over or fallback secondary communication path 54 providing communication between the monitoring device 16 and the security hub 26. Optionally, some of the monitoring devices 16 that do not require high bandwidth to operate may only communicate through the secondary communication path 54, such as the sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. The controller of one or more of the monitoring devices 16 also could provide a wireless communication path 52 directly to the router 28.

Figure 2:
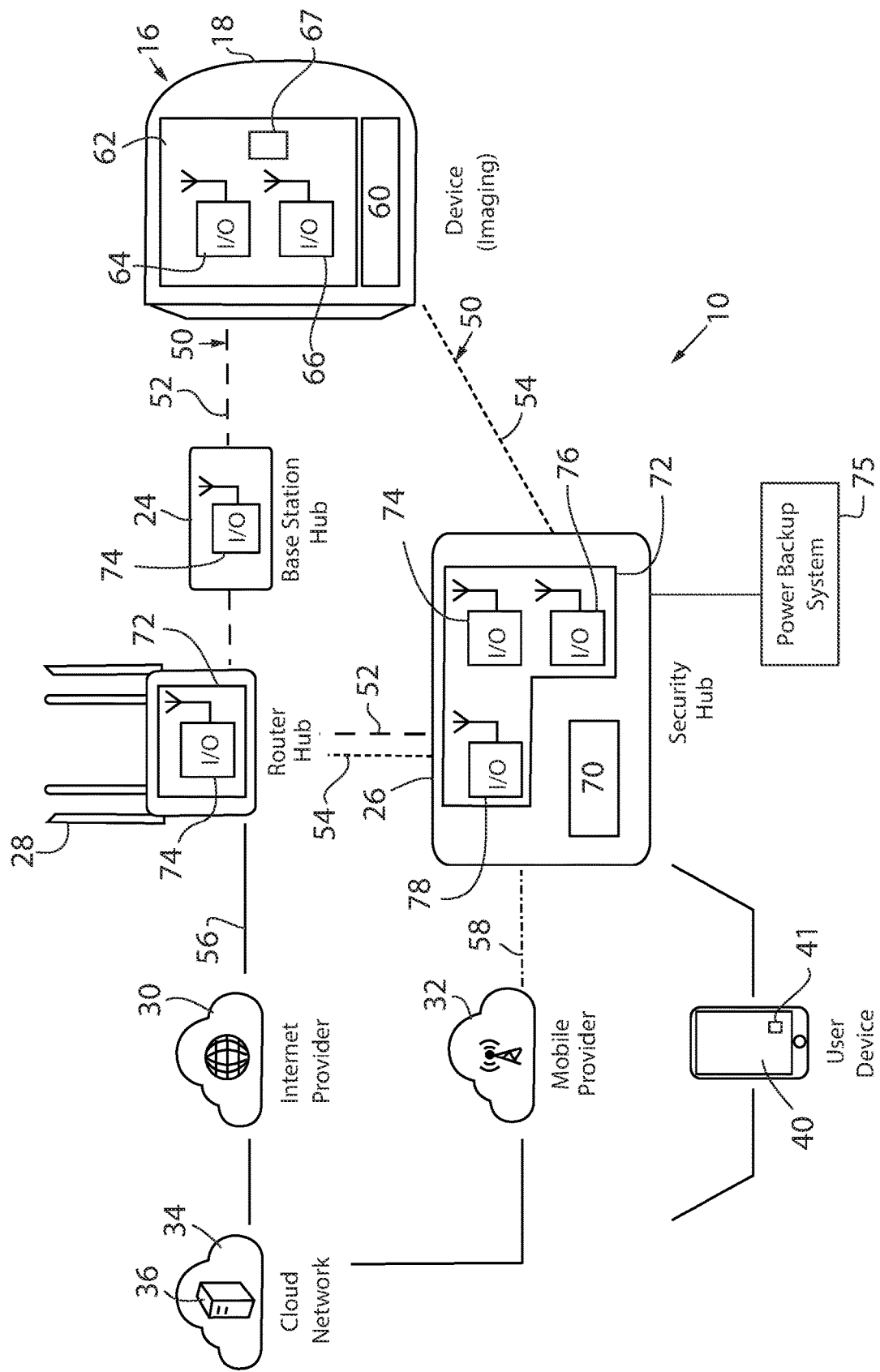
FIG. 2 is a schematic representation of a variant of the system with a secondary communication path of FIG. 1 in accordance with an aspect of the invention.

Referring now to FIG. 2, system 10 is configured to implement a seamless communication environment by implementing a communication path switching strategy as a function of the operational state of primary and/or secondary communication paths 52, 54. The seamless communication environment may be achieved by providing the monitoring device(s) 16, base station 24 and/or security hub 26 with circuitry, software, and cooperating components that facilitate recognition and diagnosis of a disruption of communications or data transfer along primary communication path 52. In addition, monitoring device(s) 16 may include circuitry, software, and cooperating components that facilitate recognition of various additional connectivity issues, including connectivity issues resulting from an outage in the primary ISP, an outage of the WIFI communication protocol in the WLAN operating environment or a power outage resulting in the electrical shutdown of base station 24 and gateway router 28, in the primary communication path 52. If connectivity issues in the primary communication path 52 are recognized, then system 10 automatically switches to implementing data transfer through the secondary communication path 54 in order to maintain communications through system 10 and facilitate troubleshooting the issues with primary communication path 52.

Still referring to FIG. 2, each monitoring device 16 is configured to acquire data and to transmit it to a respective hub 24 and/or 26 for further processing and/or further transmission to a server such as the server 36 of the cloud-based control service system 34 and/or the user device(s) 40. The server 36 or other computing components of system 10 or otherwise in the WLAN 12 or WAN 14 can include or be coupled to a microprocessor, a microcontroller or other programmable logic element (individually and collectively considered "a controller") configured to execute a program. The controller also may be contained in whole in the monitoring device 16, base station hub 24, security hub 26, and/or the WIFI hub or router 28. Alternatively, interconnected aspects of the controller and the programs executed by it could be distributed in various permutations within the monitoring device 16, the hubs 24 and 26, the router 28, and the server 36. This program may be utilized in filtering, processing, categorizing, storing, recalling and transmitting data received from the monitoring device 16 via the hubs 24 and 26, router 28, and 36. Server 36 or other appropriate system device may also be in communication with or include a computer vision program ("CV"), which can apply one or more filters or processes, such as edge detection, facial recognition, motion detection, etc., to detect one or more characteristics of the recording such as, but not limited to, identifying an individual, animal, vehicle, or package present in the recording.

Still referring to FIG. 2, each monitoring device 16 may be battery powered or wired to a power source and is shown here with a power supply 60. Each monitoring device 16 has circuitry 62 that includes corresponding hardware, firmware, software, or any combination thereof. In the case of a camera-type imaging device 18 that may also have sensors and audio capability, the circuitry 62 may include, for example, imagers, an audio circuit, a media encoder, a processor, and a non-transient memory storage device, among other components. Regardless of the particular type of monitoring device 16, the circuitry 62 of monitoring devices 16 also includes multiple wireless I/O communication devices or radios, including a primary radio 64 and a secondary radio 66 and, optionally, a radio frequency detector and/or a wireless frequency spectrum analyzer 67.

Still referring to FIG. 2, as shown in security hub 26, each hub has circuitry 72 that includes corresponding hardware, firmware, software, or any combination thereof for controlling, for example, data transmission or other communications through respective segments of system 10. Circuitry 72 includes a processor and a non-transient memory storage device, among other components. Circuitry 72 of the different hubs of system 10 may have different numbers and types of wireless I/O communication devices or radios, while allowing for the establishment of discrete communication paths 50, with each radio including, for example, a transceiver and cooperating antenna for transmitting and receiving signals or data. For example, the circuitry 72 of router 28 is shown with a primary radio 74 that transmits and receives data within the WLAN 12 (FIG. 1), whereas the circuitry of security hub 26 is shown with multiple radios. The security hub 26 includes a primary radio 74 which communicates with the primary radio 74 of router 28, a secondary radio 76 which communicates with the secondary radio 66 of the monitoring device 16 through the communication paths 54 of WLAN 12 (FIG. 1), and a cellular radio 78 that transmits data between the WLAN 12 (FIG. 1) and WAN 14 (FIG. 1) through the cellular communication path 58.

Still referring to FIG. 2, primary radios 64, 74 transmit data at different frequencies and bandwidths than the secondary radios 66, 76 so that the primary and secondary communication paths 52, 54 correspondingly define different operational frequencies and bandwidths. While it is conceivable that the secondary communication path 54 may have a higher frequency than the primary communication path 52, the primary communication path 52 has a higher frequency, a higher bandwidth, and a lower range than the secondary communication path 54. More typically, the primary communication path 52 provides medium range connectivity and operates using a WIFI communication protocol, such as those prescribed by the IEEE 802.11 standards. Although the primary communication path 52 is illustrated as a single path, it is understood that the primary communication path 52 may provide multi-component WIFI communications by, for example, dual-band implementation(s) and corresponding radio(s) that can communicate at both 2.4 GHz and 5 GHz WIFI frequencies. Suitable frequencies of secondary communication path 54 include, but are not limited to, RF ranges of 800-900 Mhz, 80-90 Mhz, and cellular (3G, 4G, LTE, 5G) bands, and which may be a proprietary communications protocol, such as the ArloRF sub-GHz protocol.

Figure 3:
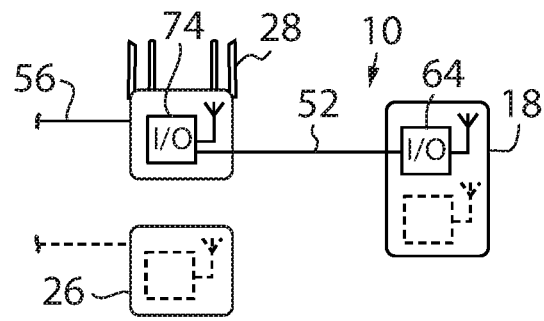
FIG. 3 is a schematic representation of data communication through a primary communication path of the system in an operational state in accordance with an aspect of the invention.

Referring to FIGS. 3-6, a representation of radio and communication path control methodologies is illustrated using an example with an imaging device 18 as a monitoring device 16 (FIG. 1) and with different radios implemented in different hubs (FIG. 1) as security hub 26 and router 28. Referring now to FIG. 3, system 10 is shown in a default and functioning operational state. The primary communication path 52 is properly functioning and communicatively connecting primary radio 64 of imaging device 18 through the base station hub 24 (if present) and to the primary radio 74 of router 28. In a WIFI implementation of router 28, this default primary connection provides WIFI communications within the WLAN 12 (FIG. 1) for transmitting data through system 10 and typically from WLAN 12 (FIG. 1) to WAN 14 (FIG. 1) through the internet provider system 30 (FIG. 1) for processing by server 36 (FIG. 1). The data transmitted through the primary communication path 52 may include monitoring data. Monitoring data is typically data that corresponds to the normal use of a particular monitoring device. For example, monitoring data from imaging device 18 may include data packets corresponding to an image, captured frames, or a video clip. If the monitoring device additionally includes a motion sensor and a microphone, the data may also include a trigger signal indicative of activation of the sensor and/or the detection of sound. In other types of systems, the data may include information regarding the operational state of a system, such as the settings of a thermostat or lighting system of a smart home.

The system 10, typically the imaging device 18, can monitor the primary communication path 52 for a fault state resulting from radio frequency (RF) jamming of communications by a third party, interference of communications resulting from operations of other electronic, devices or a disruption in communications due to other factors. As noted above, these disruptions can occur for any number of reasons. Examples include a primary RF (radio frequency) network outage, a primary ISP (internet service provider) outage, a primary network SSID (service set identifier) change, a primary network password or authentication failure, a possible moving of the imaging device 18 out of range of the primary radios 64, 74 (FIG. 2), network interference issues, and power loss issues. By way of example, a radio frequency detector and/or a wireless frequency spectrum analyzer 67 may be used to measure signals and interference on the primary communication path 52. Significantly for the purposes of the present invention, the imaging device 18 may detect a communication disruption/interruption resulting from an outage of the primary ISP, an outage of the WIFI communication protocol in the WLAN operating environment, a power outage resulting in the electrical shutdown of base station 24 and/or gateway router 28, a disruption in the primary communication path 52, or a disruption in communications due to other factors, by way of a device polling strategy, roaming scan, or other suitable connectivity-confirmation technique. In the event of a power outage, a power back-up system 75, such as a battery back-up system, can be activated automatically so as to supply electrical power to security hub 26.

Figure 4:
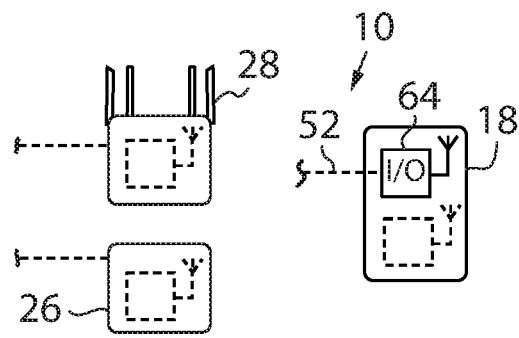
FIG. 4 is a schematic representation of disrupted communications due to a connectivity issue in the primary communication path of the system of FIG. 3 in a fault state in accordance with an aspect of the invention.

When imaging device 18 detects a fault state, it may command a response from itself, which may include attempting to reconnect primary radio 64 of imaging device 18 to primary radio 74 of router hub 28 as shown in FIG. 4. If the primary communication path 52 is defined by a dual-band WIFI system, imaging device 18 may attempt to reconnect the primary radios 64, 74 by broadcasting through the other WIFI frequency than what was dropped in the interruption. For example, if a 5 GHz connection dropped, then imaging device 18 may command an attempted establishment of a 2.4 GHz connection to establish communications through the primary communication path 52.

Figure 5:
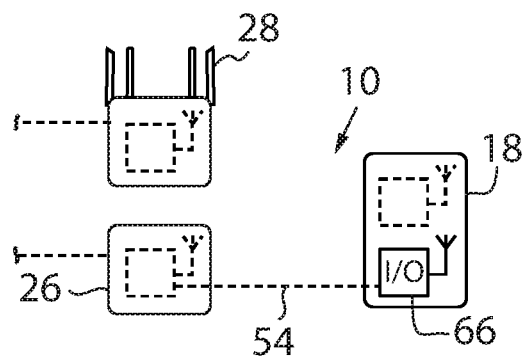
FIG. 5 is a schematic representation of an initiation of a secondary communication path of the system of FIG. 3 in accordance with an aspect of the invention.

Referring now to FIG. 5, if reconnection through the primary communication path 52 fails, then a fail-over path switching event occurs automatically within imaging device 18 to provide seamless communication through system 10. Typically, any gap in data transmission only corresponds to an amount of time in recognition of the fault state and/or attempted reconnection of the primary communication path 52. The fail-over automatic switching includes activating the secondary radio 66 within imaging device 18, which is typically in a low power state or "sleep" mode while system 10 is in an operational state with the primary communication path 52 connected. When activated by a trigger event such as the failing of one or more reconnection attempts of the primary communication path 52, the imaging device 18 activates the secondary radio 66 and its data transmissivity to secondary radio 76 of security hub 26.

Figure 6:
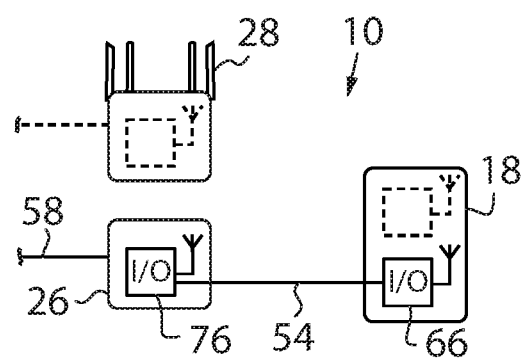
FIG. 6 is a schematic representation of data communication through the secondary communication path of the system of FIG. 3 in accordance with an aspect of the invention.

Referring now to FIG. 6, when a fail-over or fallback connection is made for communications through the secondary communication path 54, secondary radio 66 of imaging device 18 is communicatively connected to secondary radio 76 of security hub 26. In a sub-GHz implementation of security hub 26, this fallback or secondary connection provides sub-GHz communications within the WLAN 12 (FIG. 1) for transmitting data between imaging device 18 (FIG. 1) and the security hub 26. As previously described, security hub 26 is typically configured for data transmission on a cellular, sub-GHz, frequency for communication between WLAN 12 (FIG. 1) and WAN 14 (FIG. 1) through mobile provider system 32 (FIG. 1) or through internet provider 30 (FIG. 1). Hence, by communicatively connecting secondary radio 66 of imaging device 18 to secondary radio 76 of security hub 26, imaging device 18 may continue to interact with cloud-based backend control service system 34, as heretofore described, and with the one or more user devices 40, thereby maintaining an interface through which a user may interact with imaging device 18.

The system 10, typically the imaging device 18, also may monitor the secondary communication path 54 for a fault state resulting from interference with or the secondary communication path 54 or the jamming of communications on secondary communication path 54 by a third party. If imaging device 18 detects a communication disruption/interruption on both the primary communication path 52 and the secondary communication path 54 as a result of the jamming of communications thereon by a third party, imaging device 18 may generate and display an audio or visual alarm. Conversely, if imaging device 18 detects a loss of communication due to interference or some other fault on secondary communication path 54 along with connectivity issues resulting from an outage in the primary ISP, an outage of the WIFI communication protocol in the WLAN operating environment or a power outage resulting in the electrical shutdown of base station 24 and gateway router 28, in the primary communication path 52, imaging device 18 may display a less urgent communication, such as a red or flashing status indicator light, without generating an alarm.

Once communication is established on the secondary communication path 54, data packets corresponding to sounds, images, captured frames, and/or video clips captured by imaging device 18 may be transmitted from imaging device 18 through the secondary communication path 54 and security hub 26 to server 36 and/or to the one or more user devices 40, as heretofore described. In addition, data packets including information corresponding to and/or describing the basis for the disruption of communication, or in other words information reporting the basis for the fault state of primary communication path 52, may be transmitted through the secondary communication path 54 and security hub 26. For example, these data packets may include information regarding a disruption/interruption resulting from connectivity issues resulting from an outage of the primary ISP, an outage of the WIFI communication protocol in the WLAN operating environment, or a power outage resulting in the electrical shutdown of base station 24 and/or gateway router 28 in the primary communication path 52.

The noted information may be used by the controller to analyze the fault condition of the connectivity failure in the primary communication path 52 or to conduct a diagnostic scan on imaging device 18 or system 10 to facilitate the troubleshooting of potential issues therewith. Such information also may be accessible to a user through the one or more user devices 40, such as through a push notification or a corresponding graphical icon provided on a display of the one or more user devices 40, or through sequential menus that can be navigated by the user on the one or more user devices 40 using a drop down menu or the like. One or more user devices 40 may include at least one actuatable user input 41, FIGS. 1-2. In response to the information being provided on the display of the one or more user devices 40, a user may actuate the at least one actuatable user input 41 to address the information. For example, in response to notification of connectivity issues in the primary communication path 52 resulting from an outage of the primary ISP, an outage of the WIFI communication protocol in the WLAN operating environment or a power outage resulting in the electrical shutdown of base station 24 and gateway router 28, a user may actuate an input 41 to cause the corresponding one or more user device 40 to instruct imaging device 18 to attempt reestablishment of a 2.4 GHz connection to establish communications through the primary communication path 52. If such an attempt is successful, the imaging device 18 can still transmit images, albeit at lower resolution and/or at a lower frame rate than at a 5.0 GHz connection.

Figure 7:
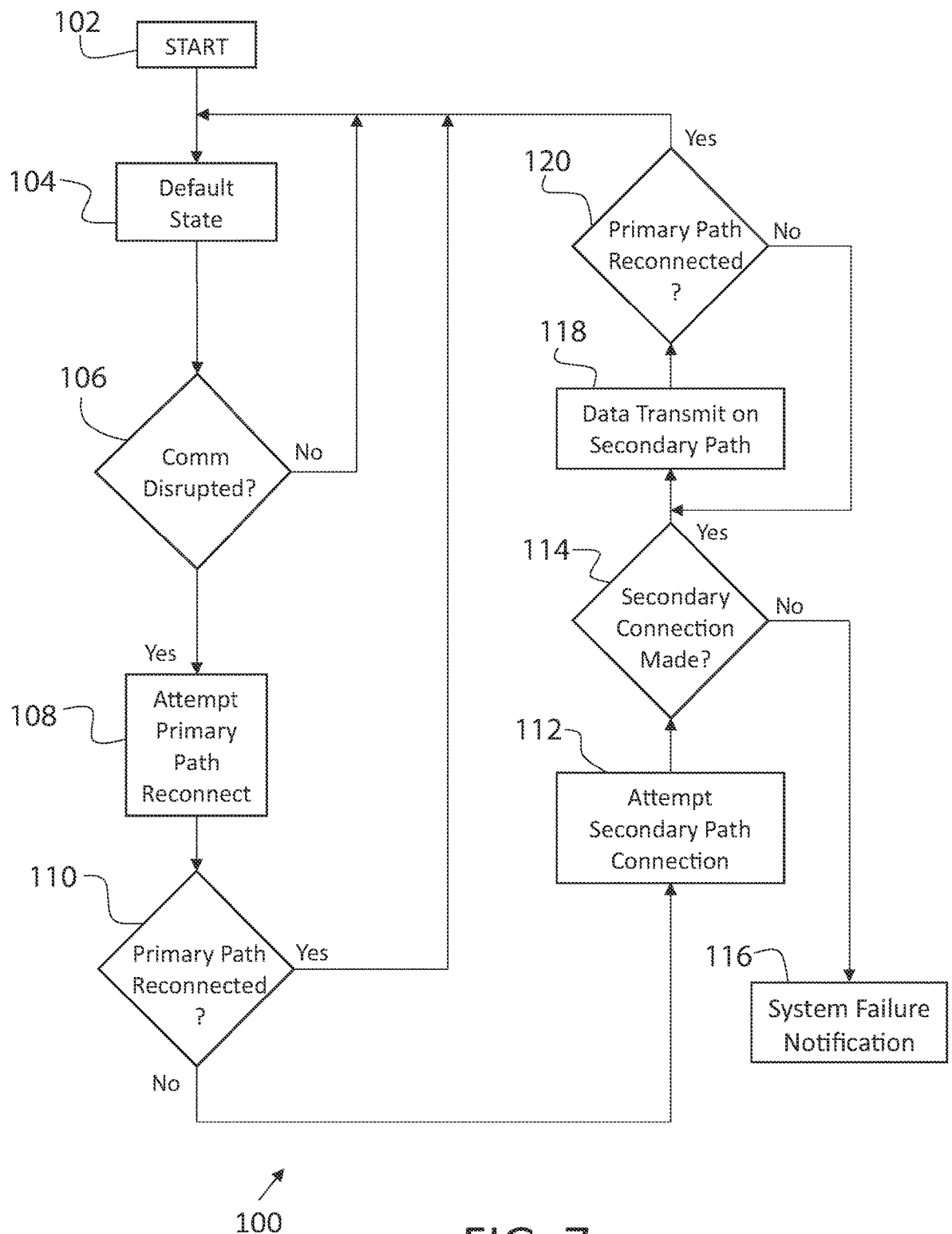
FIG. 7 is a flow chart illustrating a communication path switching operation for maintaining system communications during connection issues of a primary communication path in accordance with an aspect of the invention.

Referring now to FIG. 7 and with background reference to FIGS. 1 and 2, the automatic fallback communication path switching of a system 10 including a monitoring device 16, hubs 24, 26, etc., is shown schematically in the flowchart as process 100, which starts at block 102. At block 104, system 10 is in a default operational state in which communications are made through the primary communication path 52. At decision block 106, monitoring device 16 evaluates, as heretofore described, whether the primary communication path 52 is functioning or if there is a connectivity issue or other communications disruption such that primary communication path 52 is in a fault state. For example, monitoring device 16 determines if there is a connectivity issue or other communications disruption from an outage of the WIFI communication protocol in the WLAN operating environment or a power outage resulting in the electrical shutdown of base station 24 and/or gateway router 28 in the primary communication path 52.

If no fault in communication along primary communication path 52 is detected, system 10 remains in the default operational state, and communications continue through the primary communication path 52. If, at decision block 106, it is determined that there is a fault in the form of connectivity issue or communication(s) disruption, primary radio 64 of monitoring device 16 attempts to reconnect to primary radio 74 of hub 24 at block 108. At decision block 110, monitoring device 16 evaluates whether the reconnecting attempt was successful. If the communications are disrupted as a result of a power outage, the power back-up system 75, such as a battery back-up system, is automatically activated so as to supply electrical power to security hub 26 before reconnection is attempted in block 108. If the reconnection attempt is successful, system 10 is restored to the default operational state at block 104, and system communications continue through the primary communication path 52.

If it is determined at decision block 110 that the reconnection attempt has failed, then a fail-over or fallback switching event(s) activates the secondary radios 66, 76 in block 112 in an attempt to establish communications through the secondary communication path 54. At decision block 114, the monitoring device 16 evaluates whether the connection was made between the secondary radios 66, 76 such that data transfer is occurring through the secondary communication path 54. If not, then monitoring device 16 commands a reconnection attempt of the secondary radios 66, 76. If no connection is made through the secondary communication path 54 after a certain number of attempts or a certain amount of elapsed time for the attempts as dictated by, for example, a stored program on the monitoring device 16 or server 36, then server 36 may push an automated message to user device 40 in block 116 indicating a total communication failure within system 10. Similarly, if monitoring device 16 determines communications on both the primary communication path 52 and the secondary communication path 54 are being jammed by a third party, monitoring device 16 generates an alarm signal as the failure notification of block 116. If connection is recognized between the secondary radios 66, 76 at decision block 114, then the secondary communication path 54 is active.

If a secondary connection is made, data is transmitted over the secondary communication path 54 in block 118. As heretofore described, in the case of the monitoring device being an imaging device 18, with secondary communication path 54 active, data packets corresponding to sounds, images, captured frames, and/or video clips captured by imaging device 18 may be transmitted from imaging device 18 through the secondary communication path 54 and security hub 26 to cloud-based backend control service system 34 and/or to the one or more user devices 40. In addition, data packets including information corresponding to and/or describing the basis for the disruption of communication, or in other words the basis for the fault state of primary communication path 52, may be transmitted through the secondary communication path 54 and security hub 26. For example, these data packets may include information regarding a connectivity issue or other communications disruption from an outage of the primary ISP, an outage of the WIFI communication protocol in the WLAN operating environment, a power outage resulting in the electrical shutdown of base station 24 and/or gateway router 28 in the primary communication path 52, a disruption/interruption resulting from radio frequency (RF) jamming of communications by a third party, interference of communications resulting from operations of other electronic devices, or a disruption in communications due to other factors may be transmitted through the secondary communication path 54. For example, if it is determined that disruption/interruption of the primary communication path 52 is a result of an outage of the WIFI communication protocol in the WLAN operating environment, a "WIFI DOWN" message or a corresponding graphical icon may be transmitted to and displayed on the user device 40. In response, a user of system 10 or technical support personnel may address the issue(s) in the primary communication path 52. For example, the user may transmit instructions to imaging device 18 to attempt reestablishment of a 2.4 GHz connection to establish communications through the primary communication path 52. In this case, images can still be transmitted, albeit at a lower resolution and/or at a lower frame rate than transmission via 5.0 GHz connection.

At subsequent decision block 120, monitoring device 16 evaluates whether communication through the primary communication path 52 has been restored or reconnected. If the primary path's 52 connection is not restored, then the process returns to block 118, and communication is maintained through the secondary communication path 54 using the secondary radios 66, 76. If the monitoring device 16 recognizes in block 120 that communications through the primary communication path 52 are restored, then the process returns to block 104, where the system 10 operates in the default state with communication over the primary path 52 using the primary radios 64, 74.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A networked electronic system comprising:
    a hub primary radio being defined within a primary communication path, the primary communication path having 1) an operational state wherein data is transmittable therethrough and 2) a fault state;
    a hub secondary radio being defined within a secondary communication path; and
    an electronic device for monitoring a location the electronic device, the electronic device including:
        a device primary radio defined within the primary communication path, the device primary radio being configured to communicate with the hub primary radio over a first frequency;
        a device secondary radio defined within the secondary communication path and being configured to communicate with the hub secondary radio over a second frequency that is different than the first frequency; and
        circuitry configured to:
            monitor communication on the primary communication path and to determine if the primary communication path is in the fault state, the circuitry being configured to cause the device secondary radio and the hub secondary radio to communicate through the secondary communication path in response to the primary communication path being in the fault state; and
            monitor communication on the primary communication path and on the secondary communication path and:
                if the primary communication path returns to the operational state after being in the fault state, restoring communication between the device primary radio and hub primary radio on the primary communication path; and
                if communications tion on both the primary communication path and the secondary communication path are jammed, generating an alarm.

2. The networked electronic system of claim 1, wherein the system is configured such that, when the primary communication path is in an operational state, the device primary radio and the hub primary radio communicate through the primary communication path.

3. The networked electronic system of claim 2, wherein:
    the primary communication path is a wireless local area network (WLAN); and
    the fault state is defined at least in part by an outage of the WLAN.

4. The networked electronic system of claim 2, wherein:
    the device primary radio is electrically powered; and
    the fault state is defined by a power outage to the device primary radio.

5. The networked electronic system of claim 1, wherein circuitry of the electronic device is configured to detect a communication failure through the primary communication path.

6. The networked electronic system of claim 5, wherein the circuitry of the electronic device is configured to activate the device secondary radio upon detection of the communication failure through the primary communication path.

7. The networked electronic system of claim 5, wherein, upon detection of the communication failure between the device primary radio and the hub primary radio through the primary communication path, the circuitry is configured to:
    conduct a roaming scan through the primary communication path;
    attempt to reestablish communications through the primary communication path; and
    upon failure to reestablish communications through the primary communication path, activate the device secondary radio to communicate with the hub secondary radio through the secondary communication path.

8. The networked electronic system of claim 1, further comprising a user interface operatively connectable to the electronic device, the circuitry being configured to communicate information corresponding to the fault state to the user interface for display on the user interface.

9. The networked electronic system of claim 1, wherein the system is a monitoring system and the electronic device is a monitoring device, and wherein the monitoring device is defined by at least one of:
    an imaging device that is configured to capture visual images or video of a monitored area within the environment;
    an audio device that includes at least one of: (i) a microphone, and (ii) a speaker configured for audio communication or providing audible alerts; and
    a sensor that is configured to detect at least one of: (i) motion, (ii) opening or closing events of doors or windows, (iii) smoke, (iv) carbon monoxide, (v) water leaks, and (vi) temperature changes.

10. The networked electronic system of claim 1, wherein the first frequency is higher than the second frequency.

11. The networked electronic system of claim 10, wherein the second frequency is in a sub-GHz (gigahertz) frequency band.

12. A networkable electronic device for monitoring a location, the networkable electronic device comprising:
    a first radio that is wirelessly connectable to a WLAN that operates at a first frequency; and a second radio that is wirelessly connectable to the WLAN and that operates at a second frequency that is different than the first frequency;
wherein the device is configured such that:
communication on the WLAN is monitored;
the second radio communicates with the WLAN upon detection of a fault in the WLAN;
the first radio communicates with the WLAN in the absence of the detection of a fault in the WLAN; and
an alarm is generated in response to the communication by the first radio with the WLAN and communication with the second radio with the WLAN being jammed.

13. The networkable electronic device of claim 12, wherein the first radio is wirelessly connectable to the WLAN along a primary communication path and the second radio is wirelessly connectable to the WLAN along a secondary communication path.

14. The networkable electronic device of claim 13, further comprising circuitry that is configured to detect the fault state of the primary communication path and, upon detection of the fault state, to activate the second radio to communicate through the secondary communication path.

15. The networkable electronic device of claim 14, wherein the circuitry is configured to communicate information corresponding to the fault state of the primary communication path along a secondary communication path.

16. The networkable electronic device of claim 15, wherein
the fault state is defined at least in part by an outage of the WLAN.

17. A method for detecting and responding to a fault in a wireless network (WLAN), the method comprising:
monitoring communication of data between a device primary radio of an electronic device that is configured to monitor a location and a hub primary radio through a primary communication path with the electronic device;
transferring communication of data to a secondary communication path between a device secondary radio of the electronic device and a hub secondary radio in response to a fault in the primary communication path, the secondary communication path having a different frequency than the primary communication path;
restoring communication of data between the device primary radio and hub primary radio on the primary communication path in response to the primary communication path returning to the operational state after being in the fault state; and
generating an alarm in response to the jamming of the first communication path and the second communication path.

18. The method of claim 17, wherein:
data is transmitted on the primary communication path at a first frequency of at least 2.4 GHz; and
data is transmitted on the secondary communication path at a second frequency, the second frequency being less than the first frequency and being in a sub-GHz frequency band.

19. The method of claim 17, wherein the primary communication path utilizes a WIFI communication protocol, and wherein the outage of the fault comprises at least one of an outage of the WIFI communication protocol of the primary communication path and a power outage to the device primary radio.

* * * * *